Figure 1:
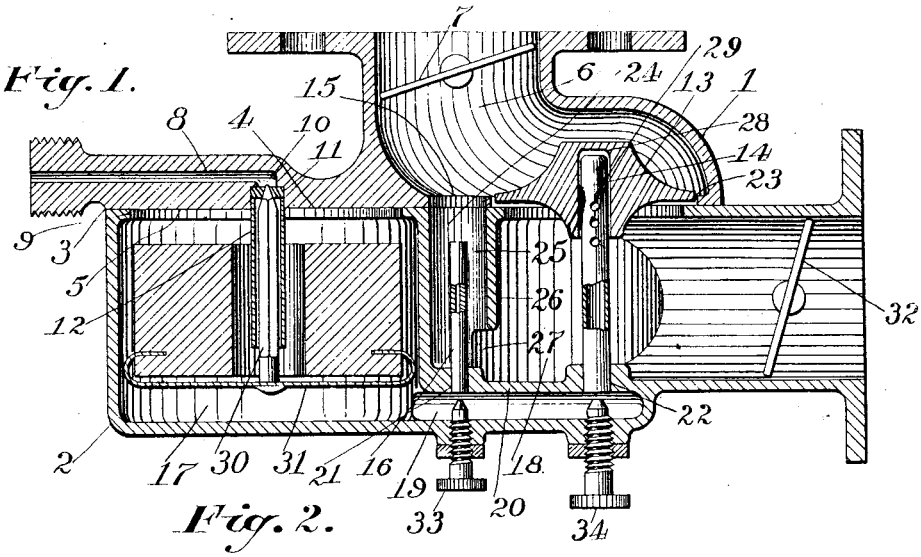

W. W. MUIR.
CARBURETER.
APPLICATION FILED MAY 4, 1914.

1,164,661.

Patented Dec. 21, 1915.

Witnesses
Porter H. Plautt
A. G. Donegan

Inventor
Wellington W. Muir
by
Stuart & Stuart
Attorneys

UNITED STATES PATENT OFFICE.

WELLINGTON W. MUIR, OF BALTIMORE, MARYLAND.

CARBURETER.

1,164,661.  Specification of Letters Patent.  Patented Dec. 21, 1915.

Application filed May 4, 1914. Serial No. 836,063.

*To all whom it may concern:*

Be it known that I, WELLINGTON W. MUIR, a citizen of the United States of America, residing at the city of Baltimore, State of Maryland, have invented certain new and useful Improvements in Carbureters, of which the following is a specification.

This invention relates to a carbureter of the constant level type for use with internal combustion engines.

The object of the invention is to produce a cheap and simple carbureter which, because of its small cost and efficiency in obtaining the greatest amount of power from a given amount of gasolene, is particularly adapted for use with low-priced road vehicles such as are now coming on the market.

While I refer particularly to the use of this carbureter on cycle cars, light runabouts and the like, its efficiency, capacity and perfection of operation, in that it gives the most effective mixture at all speeds, are such that its use with the heavier and high-priced machines where cost is less of an element, is not prohibited.

In the manufacture of the carbureters now on the market, a large part of the expense is incurred because of the costly machine work involved in the fitting of the various covers, tubes, passages, valve seats, etc., and one of the objects of the present invention is to produce a carbureter so constructed that this costly work is eliminated and the expense of coring the float chamber, the carbureting chamber and the various passages is largely reduced. To this end, I have so designed the carbureter that it is formed of two parts or integral members which, instead of having to be turned with extreme exactness so that the turned-up edges of one part fit within corerspondingly turned edges of the other part, are formed with two juxtaposed plane surfaces so that to finish the carbureter after the parts have been cast, it is only necessary to grind these plane or flat surfaces by means of a machine which is a well-known commercial article, insert a valve seat in a position in which it is conveniently accessible, place the parts in registration and fasten them together with screws or by other means.

In the preferred form of the invention as shown, the top section includes the delivery passage, the mixing chamber and the gasolene pipe. The two latter open on the plane surface referred to, upon which the carbureter is cut, and in the gasolene pipe a chamber is formed to receive a valve seat and the top end of a depending tube which serves as a guide for the float valve. The mixing chamber is also formed with a considerable opening through the flat surface which is to be superimposed upon the lower half of the carbureter, and in this opening, the weighted air float hereinafter described is located. The top half of the carbureter is of course of sufficient area to cover the float chamber and the top opening of the inlet passage, which are formed in the lower half of the carbureter, and have a flat rim forming part of the lower flat surface.

The other features of the invention relate to the operation of the carbureter rather than to its design with reference to ease of construction and particularly to means for controlling the ratio of the mixture at various speeds. This consists of an air float or float valve in combination with an upright gasolene nozzle.

In the preferred form of the invention, the air float is weighted or, as shown, it is a weight serving as an air float and having an opening to receive the end of the gasolene nozzle which is itself provided with an outlet for the gasolene, so arranged that the passage is opened or closed, or the opening reduced or increased, as the float moves up and down. The nozzle fits within the float aperture with but a slight clearance so that the float and piston thus formed serve as a dash pot to dampen the motion and eliminate the tendency to vibration resulting from the pulsations in the manifold.

Other important features of the invention are the combination with the device just described of a separate pilot or low throttle carbureter, which has an important function in priming the engine as well as in running it at low speed. Also the manner of arrangement of the gasolene pipe, the valve seat therein and of guiding the float and the float valve, are of interest.

A carbureter embodying the features of my invention in its preferred form is illustrated in the accompanying drawings, in which—

Figure 2:
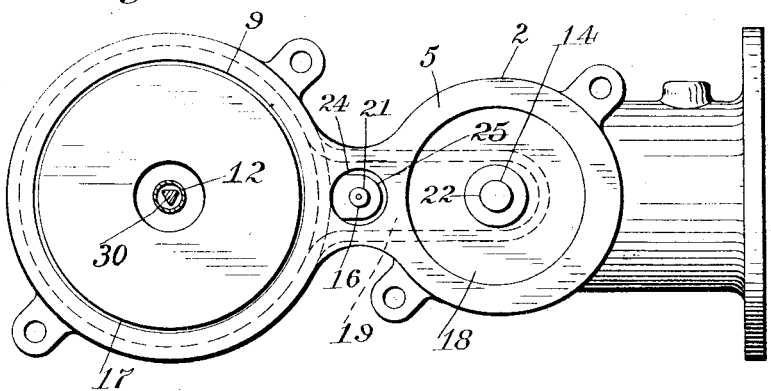
Figure 3:
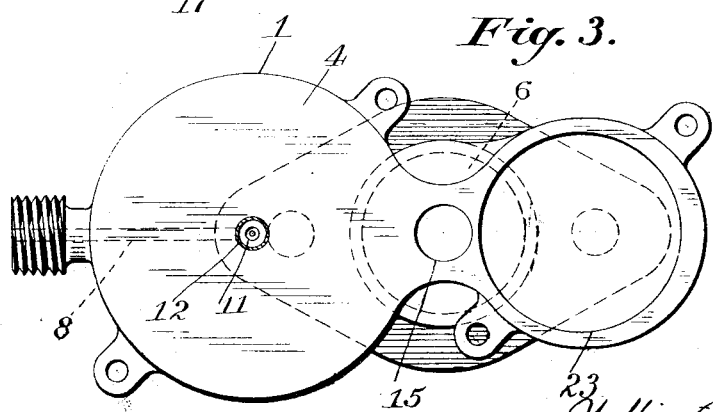

Figure 1 is a vertical central cross-section; Fig. 2 is a plan of the bottom part; and Fig. 3 is a bottom plan of the top part of the carbureter.

Referring to the drawings by numerals, each of which is used to indicate the same or similar parts in the different figures, the carbureter consists of a top section 1 and a bottom section 2, the carbureter body being divided on a horizontal flat plane 3 to form the sections 1 and 2, the section 1 having its bottom surface 4 and the section 2 having its top surface 5 perfectly flat and smooth so that when the carbureter is set up, the two sections being joined in the horizontal plane 3, and the flat surfaces superimposed one upon the other, a tight closure results, and while the manner of fitting the two together is simple, the joint is tight and leakage is eliminated.

The top section, as shown, includes the delivery passage 6 in which is the throttle 7, the gasolene passage 8 and the mixing chamber 6', and on the bottom of this section is formed a flat surface 4 to coöperate with the flat surface 5 of the bottom section. The gasolene passage 8 is formed with a chamber 10 opening onto the bottom surface 4 and adapted to receive a seat ring 11 for the fuel valve which is held in position by the depending tube 12 which is pressed into the chamber after the seat ring has been inserted.

Leading from the delivery passage, there is an opening through the bottom surface 4 of the top section. This receives the air float 13 and is concentric with the gasolene nozzle 14, forming the main mixture passage. Another opening 15 may be provided over the pilot or priming nozzle 16. This serves as an exit for the mixture formed at this nozzle, which primes the engine and runs it at low throttle.

The bottom section 2 includes a float chamber 17 and an admission passage 18, the float chamber having a recess 19 which extends beneath the carbureting chamber. The top wall 20 of this recess, which is the bottom wall of the carbureting chamber, is pierced by two openings 21 and 22 in which are placed the upright nozzles 16 and 14 respectively, the first being the priming or pilot nozzle and the second, the service nozzle. The top of the bottom section is formed with an upwardly disposed flat surface 5 upon which the top section is superimposed. The float chamber is opened for the full extent of its cross-section and the flat surface 5 is continued about the entire periphery of the opening. The top of the admission passage is apertured at 23, the opening thus formed being preferably slightly smaller than but directly beneath the corresponding opening in the top section so that the float 13 rests on the flat surface 5 about the periphery of the opening 23. The bottom section may also be provided with an upwardly disposed opening 24 which registers with the aperture 15 in the top section. This opening is of an area preferably equal to the cross-section of the priming carbureter chamber 25 which surrounds the nozzle 16, the chamber being inclosed by a depending wall 26 beneath which is an opening 27 through which the air used in the priming mixture passes.

The nozzle 16 may be of any usual and preferred form, but the main nozzle 14 in the preferred form is of peculiar construction. The outlet opening, instead of being at the top, is formed in the side and extends along the side from a point opposite the lower position of the bottom edge of the float 13 to a point in the plane of this bottom edge when the float is in its upper position. This outlet may be in the form of several perforations arranged up and down the nozzle tube, or in the form of a slot, or otherwise shaped within the scope of the invention. The top end of the nozzle is closed and the nozzle itself is cylindrical in form and inclosed within a cylindrical aperture 28 in the float, the aperture forming a running fit with the pipe, so that the latter is in effect a piston within its cylinder. In this way, the float, moving up and down and opening and closing gasolene apertures, serves to regulate the gasolene supply as the draft increases and decreases, and the aperture in connection with the float aperture, forms a dash pot by which the action of the float is dampened and the tendency to vibrate, reduced if not eliminated.

The arrangement of the gasolene inlet is of interest. The gasolene valve, as we have pointed out, is formed with the seat 11 pressed into a downwardly disposed chamber in the bottom of the top section. This chamber also holds a depending tube 12 pressed into the chamber. The float valve 30 is in the form of an upright pin formed at the top to coöperate with the valve seat and secured at the bottom to a plate 31 on the bottom of the float. This pin may be of angular cross-section, the corners engaging the walls of the tube 12 to serve as a guide for the float, and the float itself is centrally apertured about the valve 30 to admit the tube.

The operation of the carbureter will be understood from the description and preamble. Starting is accomplished with the carbureter valve 32 almost closed and the throttle 7 open. If excessive priming is necessary, the valve 32 may be completely closed and the engine turned over to inject pure gasolene into the cylinders. This is done by means of the suction of the engine exerted on the nozzle 16, for when the valve 32 is closed, the entire suction is applied to the drawing in of gasolene. As the engine starts, the valve 32 is thrown open and the engine controlled by means of the throttle 7. At low throttle, the air passes through the opening 27 by the nozzle 16 so that we have a pilot or low throttle carbureter which erates independently of the main gasolene nozzle during priming and at low throttle. The main nozzle 14 comes into operation only when the float 13 is lifted by the draft. To accomplish this, the valve 32 must be open to a certain degree. When the float 13 is lifted, the gasolene outlets 29 in the main nozzle are gradually uncovered and an appropriate mixture is formed. As the draft increases, the float continues to rise until it is stopped by the top wall of the carbureter or other suitable means, and the gasolene supply increases correspondingly so that we may have any predetermined mixture at the various positions of the air valve. If the throttle opening is reduced sufficiently, the float 13 drops and the pilot carbureter is the only one in operation, the engine being run on this at low throttle.

The openings 29 in the main nozzle and the opening in the upright nozzle 16 are determined by experiment and they may be so fixed that adjustment is unnecessary. However, if desired, adjusting valves 33 and 34 may be used. Thus we have a convenient and economical operation giving the desired mixture at all throttle positions and all speeds and requiring the minimum of adjustment. In addition to this, the carbureter is adapted to be constructed at the very smallest cost. To this end, it is built in two sections divided on a flat plane so that the flat surfaces may be ground and the sections joined without incurring excessive expense for finishing and fitting. Also the various chambers are conveniently accessible when the sections are separated so that the operation of casting is simple and such finishing as is necessary can be done easily and cheaply.

I have thus described specifically and in detail a single embodiment of my invention in order that its nature and operation may be clearly understood. However, the specific terms herein are used in their descriptive rather than in their limiting sense and the scope of the invention is defined in the claims.

I claim—

1. A carbureter consisting of two integral sections superimposed one upon the other, the contacting surfaces of each section being flat and in a single plane, one section including a delivery passage, a mixing chamber and a cap for the float chamber; the other section including a float chamber and an air inlet passage, the air passage being external to the float chamber and both sections being so constructed that no portion of either projects through the plane of contact. an air float valve controlling the passage of air from the inlet passage to the mixing chamber, the top surface of the bottom section acting as a seat for the valve.

2. In a constant level carbureter, a fuel nozzle, a weighted air float having an aperture to receive the end of the fuel nozzle, the latter being closed at the end and having an aperture in the side which is varied in extent as the float is lifted, a pilot nozzle, an inlet valve and a throttle valve.

3. A carbureter consisting of two sections superimposed one upon the other, the contacting surfaces of each section being flat and in a single plane, one section including a delivery passage, a mixing chamber and a gasolene passage, the other section including a float chamber, and an inlet passage the two sections being so formed that neither projects through the plane of the contacting flat surfaces, an air float controlling the passage of air from the inlet to the mixing chamber, the top surface of the bottom section acting as a seat for the valve.

4. A carbureter consisting of two sections superimposed one upon the other, one section including a delivery passage and a mixing chamber, the other including an inlet passage, an opening in the contacting surface of one section leading from the mixing chamber, an opening in the other section leading to the carbureting chamber, the openings being concentric and superimposed one upon the other when the carbureter is set up, an air float valve located in the aperture, a gasolene nozzle in the carbureting passage in the line with the registering openings and means for supplying gasolene to the nozzle, an air float valve controlling the concentric openings in the two sections, the top surface of the bottom section around the opening acting as a valve seat.

5. A carbureter consisting of two sections superimposed one upon the other, the contacting surfaces being flat, one section including a delivery passage and a mixing chamber, the other including an air inlet passage, an opening in the contacting surface of one section leading from the mixing chamber, a smaller opening in the other section leading to the air-inlet passage, the openings being concentric and superimposed one upon the other when the carbureter is set up, an air float valve located in the aperture in the first section and resting on the periphery of the aperture in the second section, a gasolene nozzle in line with the registering openings and means for supplying gasolene to the nozzle, a by-path for the air at the side of the float opening and a gasolene nozzle in said by-path.

6. A carbureter consisting of two sections superimposed one upon the other, the contacting surfaces of each section being flat and in a single plane, one section including a delivery passage and a gasolene passage and a mixing chamber, the other section including a float chamber, and an inlet passage, the float chamber having a recess which extends under the carbureting chamber, an upright nozzle leading from the top wall of the recess through the top wall of the carbureting chamber, the latter having an opening surrounding the nozzle, and a float valve therein, having a socket to inclose the end of the nozzle, a float valve being seated on the top surface of the lower section of the carbureter.

7. A carbureter consisting of two sections superimposed one upon the other, the contacting surfaces of each section being flat and in a single plane, one section including a delivery passage and a gasolene passage, the other section including a float chamber, a carbureting chamber and an inlet passage, the float chamber having a recess which extends under the carbureting chamber, an upright nozzle leading from the top wall of the recess through the top wall of the carbureting chamber, the latter having an opening surrounding the nozzle, and a float valve therein having a socket to inclose the end of the nozzle, and a supplemental nozzle.

8. A carbureter consisting of two sections superimposed one upon the other, the contacting surfaces of each section being flat and in a single plane, one section including a delivery passage and a gasolene passage, the other section including a float chamber, a carbureting chamber and an inlet passage, the float chamber having a recess which extends under the carbureting chamber, an upright nozzle leading from the top wall of the recess through the top wall of the carbureting chamber, the latter having an opening surrounding the nozzle, and a float valve therein having a cylindrical socket to inclose the end of the nozzle which is also cylindrical, the nozzle being apertured on the side so that the aperture is covered by the lower part of the float in normal position, a pilot nozzle also extending through the top wall of the recess, the top and bottom sections having registering apertures leading to the delivery passage from a part of the carbureting chamber in the vicinity of the pilot nozzle, and a depending wall surrounding the end of the upright nozzle, the wall being discontinued near the base of the nozzle to form an air opening.

9. A constant level carbureter having a fuel chamber, a carbureting chamber and a delivery passage with a throttle valve, an upright fuel nozzle extending from the fuel chamber into the carbureting chamber, a valve seat surrounding the nozzle and opening from the carbureting chamber to the delivery passage, an air float on the seat having a cylindrical opening to receive the end of the nozzle into which the latter extends, the nozzle being closed at the end and having an opening at the side covered by the lower portion of the air float when the latter is on the seat.

10. A constant level carbureter having a fuel chamber, a carbureting chamber and a delivery passage with a throttle valve, an upright fuel nozzle extending from the fuel chamber into the carbureting chamber, a valve seat surrounding the nozzle and opening from the carbureting chamber to the delivery passage, an air float on the seat having a cylindrical opening to receive the end of the nozzle, into which the latter extends, the nozzle being closed at the end and having an opening at the side covered by the lower portion of the air float when the latter is on the seat, a pilot nozzle, an opening leading from the carbureting chamber to the delivery passage adjacent the pilot nozzle, an air opening from the carbureting chamber adjacent the base of the pilot nozzle, an inlet to the carbureting chamber, a valve therein and a throttle valve controlling the delivery.

11. A carbureter composed of two separate integral sections superimposed one upon the other, the contacting surface of each section being flat and in a single plane, the two sections being so formed that no part of either projects through the flat plane of the contacting surfaces; the bottom section comprising the float chamber and the inlet air passage and the top section comprising a cap or lid to the float chamber, the mixing chamber and delivery passage, an air float valve for controlling the flow of air from the inlet passage to the mixing chamber, a fuel nozzle also controlled by the air float, the top surface of the bottom section furnishing a seat for the valve, a by-path from the inlet to the mixing chamber not controlled by the air float, and a second fuel nozzle in said passage.

Signed by me at Baltimore, Maryland, this 24th day of April, 1914.

WELLINGTON W. MUIR.

Witnesses:
 EDWARD L. BASH,
 EDWIN F. SAMUELS.